United States Patent
Okabe

(10) Patent No.: US 8,537,024 B2
(45) Date of Patent: Sep. 17, 2013

(54) SANITARY ROTARY VALVE

(76) Inventor: Shuichi Okabe, Kawaguchishi (JP)

(*) Notice: Subject to any disclaimer, the term of this patent is extended or adjusted under 35 U.S.C. 154(b) by 448 days.

(21) Appl. No.: 12/814,557

(22) Filed: Jun. 14, 2010

(65) Prior Publication Data

US 2011/0025520 A1 Feb. 3, 2011

(30) Foreign Application Priority Data

Jul. 30, 2009 (JP) ................... 2009-177278

(51) Int. Cl.
*G08B 21/00* (2006.01)

(52) U.S. Cl.
USPC ............ 340/679; 340/635; 340/648; 340/650

(58) Field of Classification Search
None
See application file for complete search history.

(56) References Cited

U.S. PATENT DOCUMENTS

| | | | | |
|---|---|---|---|---|
| 4,135,079 A | * | 1/1979 | McGraw | 392/441 |
| 5,043,592 A | * | 8/1991 | Hochstrasser | 290/52 |
| 5,137,255 A | * | 8/1992 | Sumida et al. | 251/77 |
| 6,473,917 B1 | * | 11/2002 | Mateina | 4/676 |
| 8,102,138 B2 | * | 1/2012 | Sekine et al. | 318/646 |
| 2005/0241346 A1 | * | 11/2005 | Choi | 68/140 |
| 2011/0006234 A1 | * | 1/2011 | Schade | 251/214 |
| 2011/0058383 A1 | * | 3/2011 | Lai | 362/529 |
| 2011/0062358 A1 | * | 3/2011 | Kawamura et al. | 251/129.01 |

FOREIGN PATENT DOCUMENTS

JP 2005200125 A * 7/2005

* cited by examiner

*Primary Examiner* — Julie Lieu

(74) *Attorney, Agent, or Firm* — Holtz, Holtz, Goodman & Chick, P.C.

(57) ABSTRACT

A sanitary rotary valve has a casing, a side plate arranged at a first side of the casing, a rotor provided in the casing, a rotatable shaft for rotating the rotor, a geared motor for rotating the shaft, and a motor mount for mounting the motor. The side plate has a cylinder which extends into the casing and is inserted into the rotor, extending to an approximate center of the rotor. An angular supporting bearing for rotatably supporting the shaft is provided at an end of the cylinder disposed at the approximate center of the rotor. An electrical alarm system stops rotation of the geared motor automatically if the rotor touches the casing. A clearance between the side plate and casing can be cleaned by extracting the side plate using a hanger and connecting rod. The position of the side plate is correctly fixed by set bolts.

5 Claims, 5 Drawing Sheets

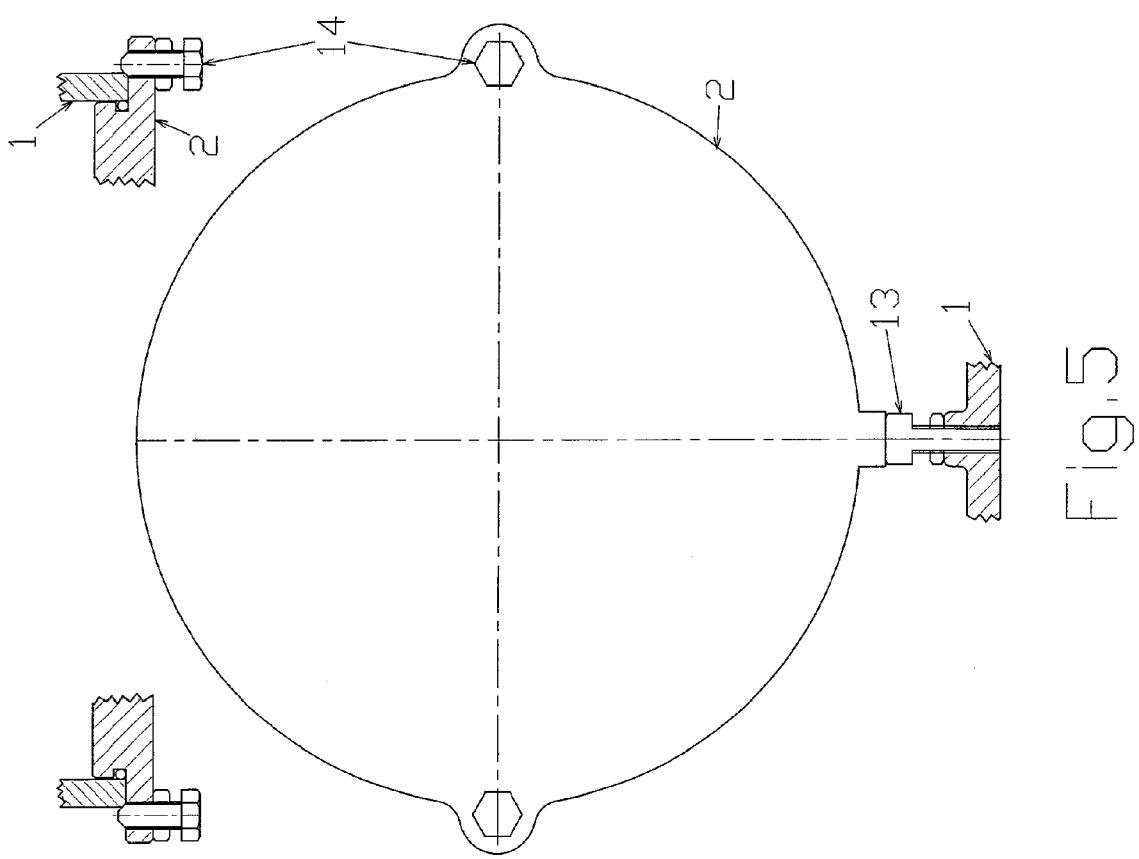

SANITARY ROTARY VALVE

BACKGROUND OF THE INVENTION

1. Field of the Invention

The present invention relates to sanitary rotary valve for the powder or particle discharging system from receiving hoppers or other up-stream equipments to outside or downstream equipments.

This device is used to discharge powder or particle quantitatively.

And, this device has another function to reduce gas flow through this device. Usually there is differential pressure between upper side and lower side of this device because powder is transported by gas flow.

The powder or particle relate to these devices are food or medicine taken by human or animals, or others that is required to be no contamination. And in case that different kinds of powder or particle is treated in same process line, this device is used to prevent mixing of kinds of powder or particle.

Inside of these devices is to be cleaned as regular maintenance to prevent contamination by rotted powder or particle of food or medicine, or to prevent mixing of different kind of powder or particle.

2. Description of the Related Art

With respect to a sanitary rotary valve for a powder discharging system, the valve as shown in FIG. 1 and FIG. 2 is used conventionally. FIG. 1 shows a sectional view of the sanitary rotary valve and FIG. 2 is a side sectional view of the sanitary rotary valve from a right side of FIG. 1, wherein a casing 1, having horizontal hole, upper opening A and lower opening B, and a side plate 2, having a center hole, and a box 2c on an outside surface, and a door 3, provided on the opposite side of side plate 2, fixed to casing 1 by knobs 3a as detachable, and a shaft 4, passing through the center hole of side plate 2, and a rotor 5, having pockets C, and fixed to shaft 4 as detachable, and ball bearings 6a, 6b, between side plate 2 and shaft 4, and a seal packing 7, between side plate 2 and shaft 4, and a motor mount 8, fixed to box 2c of side plate 2 by bolts, and a geared motor 9, fixed to motor mount 8 by bolts, and a coupling 10, connecting shaft 4 and geared motor 9, and a O-ring 11, between casing 1 and side plate 2, and a O-ring 12, between casing 1 and door 3.

Usually flanges are provided on upper side and lower side of this device to be connected with other equipments or pipe lines.

The torque of geared motor 9 is translated to shaft 4 by coupling 10. One end of shaft 4 and one end of rotor 5 have hexagonal shape or key to fit each other, and translate rotating torque. Rotor 5 is fixed by a detachable screw nut 5a.

To reduce gas flow through this device caused by differential pressure between upper side and lower side of this device, clearance between casing 1 and rotor 5 is required to be narrow such as 0.2 mm.

Casing 1 is sealed by seal packing 7, O-ring 11 and O-ring 12 to prevent leakage of inner gas and powder.

Powder or particle is dropped into pockets C through opening A by gravity, and turned by rotor 5, and discharged from pockets C through opening B by gravity.

Constant rotating speed of geared motor 9 makes discharging amount of power or particle constant.

When regular cleaning inside, door 3 is opened, and screw nut 5a is removed, and rotor 5 is extracted to outside. And inside of casing 1 and side plate 2, and rotor 5 is cleaned. After cleaning of them, rotor 5 is inserted into casing 1 and fixed to shaft 4, screw nut 5a is tightened, door 3 is closed, and operation is restarted.

However, there are two problems as for conventional sanitary rotary valve.

1) The Risk of Contamination

Shaft 4 is supported as a cantilever. Because, if journal to support shaft 4 is provided also on door 3, a lot of work is necessary to disassemble shaft 4 from journal of door 3 in each time of regular cleaning maintenance.

However, this cantilever supporting of shaft 4 causes deflection of shaft 4 by the reasons of wearing of ball bearings 6a, 6b, and/or force onto rotor 5 caused by irregular differential pressure between upper and lower sides of this device.

And in case of irregular raising up of temperature of powder or particle, the temperature of rotor 5 is raised up also, but the temperature of casing 1 is less than that of rotor 5 because casing 1 is cooled by outer atmosphere. The diameter of rotor 5 is increased by thermal expansion, but inside diameter of horizontal hole is not so expanded. Then, rotor 5 touches casing 1.

Once rotor 5 touches inner surface of casing 1, the surfaces of casing 1 and rotor 5 are grinded by abrasion, and small particles of metal are mixed into powder of process. Actually it is very difficult to detect the happening of this accident. Continuing operation without noticing this accident, huge cost happens to recall contaminated powder and social responsibility to keep safety of food or medicine is impeached severely.

2) The Difficulty of Cleaning

The inserted part of side plate 2 into casing 1, and groove 2b for O ring 11 have space to where powder invades and rots. When sudden lowering of inner pressure in casing 1, rotted powder come out from this space with gas stream, and is mixed with powder of products. According to standard for "Commercial powdered production equipment NSF/ANSI 8", spaces such as inserted part and groove 2b are to be cleaned regularly by disassembling of the device.

However, casing 1 and side plate 2 are connected with bolts, and tools are necessary to disassemble. And, there is no supporting device for hanging side plate 2, motor mount 8 and geared motor 9. These make difficult to do cleaning work as regular maintenance.

Furthermore, once side plate 2 is disassembled, the position of side plate 2 is changed from the set position initially. Because certain clearance between side plate 2 and casing 1 such as 0.1 mm is necessary for easy disassembling, and this figure of clearance is not negligible small compared with the clearance of 0.2 mm between side plate 2 and casing 1.

Therefore, it is difficult to disassemble side plate 2 for regular cleaning work.

SUMMARY OF THE INVENTION

The present invention has an object to provide a sanitary rotary valve that can solve the essential problems of the conventional sanitary rotary valve for powder discharging system as described above.

The present invention is a sanitary rotary valve which prevents an accident of touching between casing and rotor, and contamination of powder products, and huge cost to recall the powder of products.

Furthermore, the present invention solves the problem of cleaning inserted part of side plate into side plate.

BRIEF DESCRIPTION OF THE DRAWINGS

FIG. 5 is a view of the side plate showing how the side plate is supported by set bolts.

DETAILED DESCRIPTION OF THE PREFERRED EMBODIMENT

Figure 1:
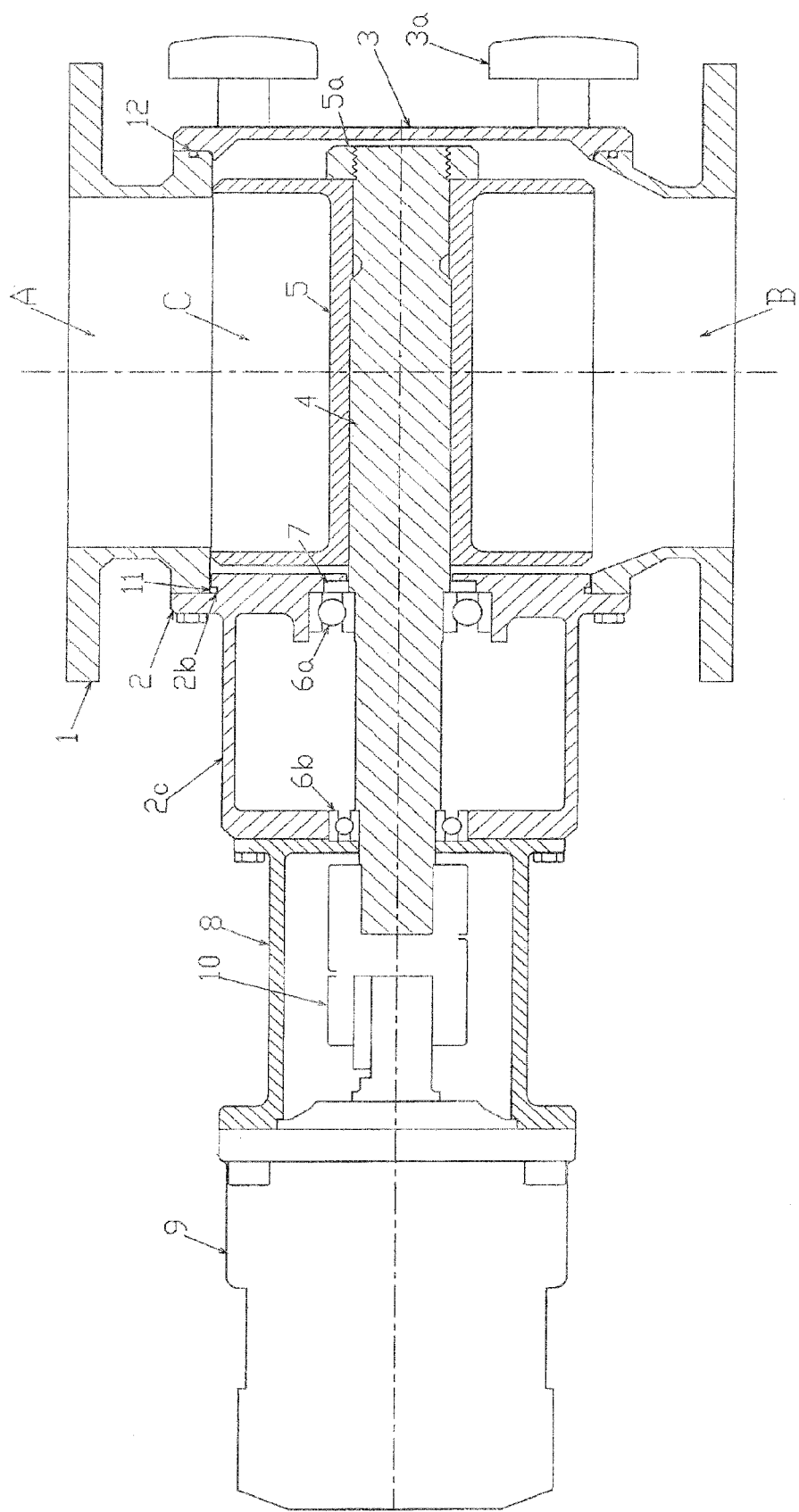
FIG. 1 is a sectional view of a prior art sanitary rotary valve.
Figure 2:
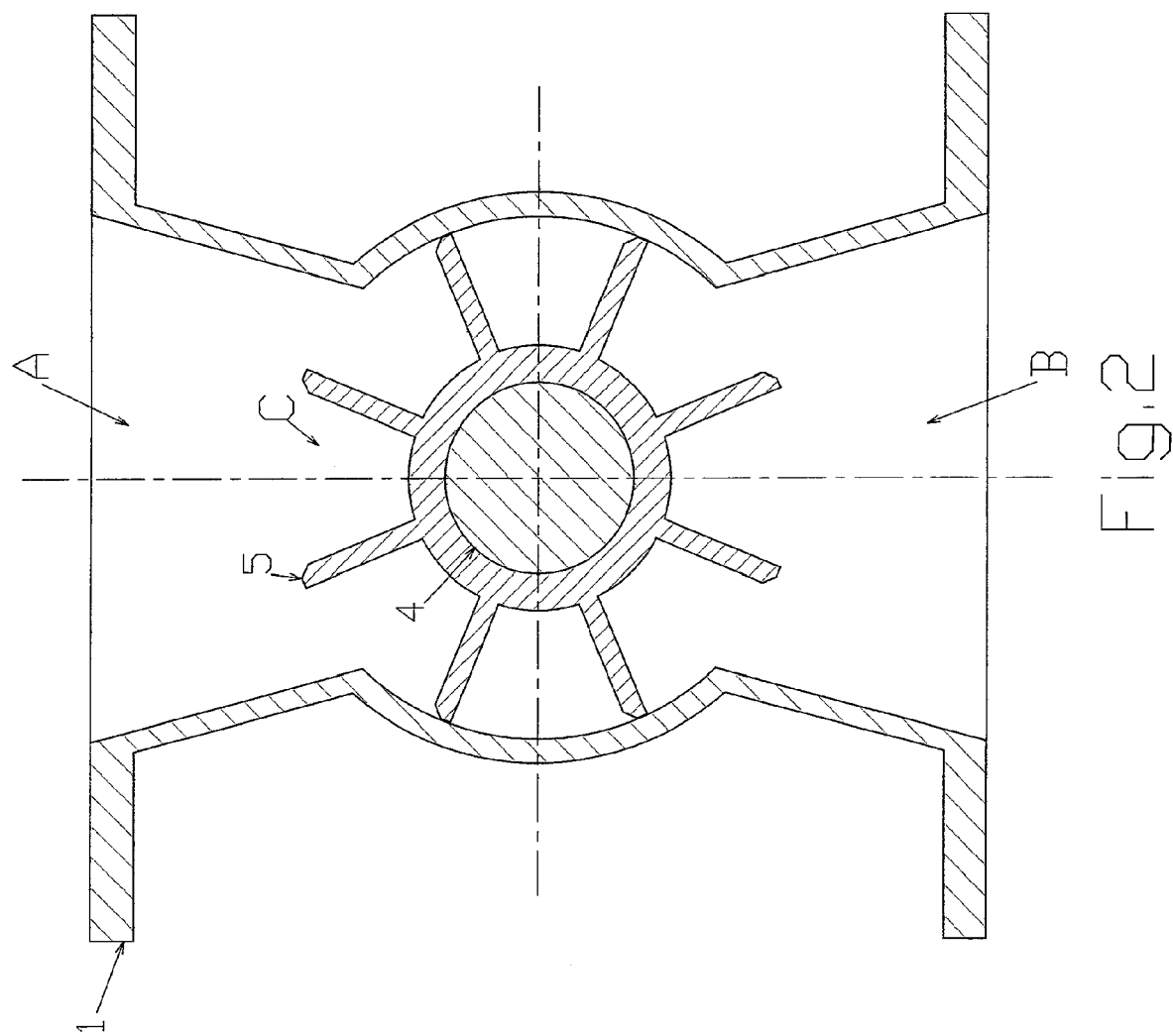
FIG. 2 is a side sectional view of the prior art sanitary rotary valve from a right side of FIG. 1.
Figure 3:
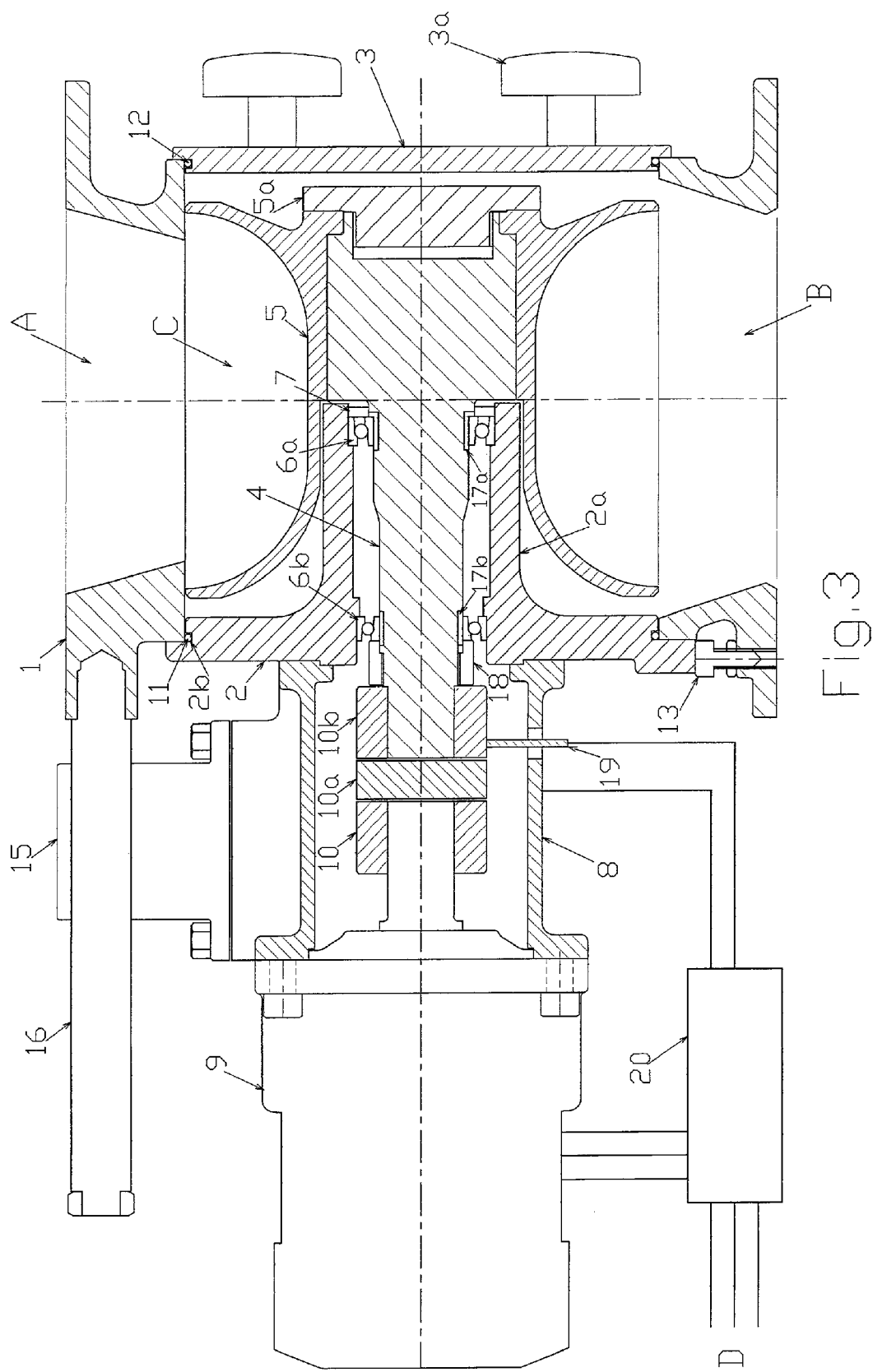
FIG. 3 is a sectional view of a sanitary rotary valve according to a preferred embodiment of the present invention.
Figure 4:
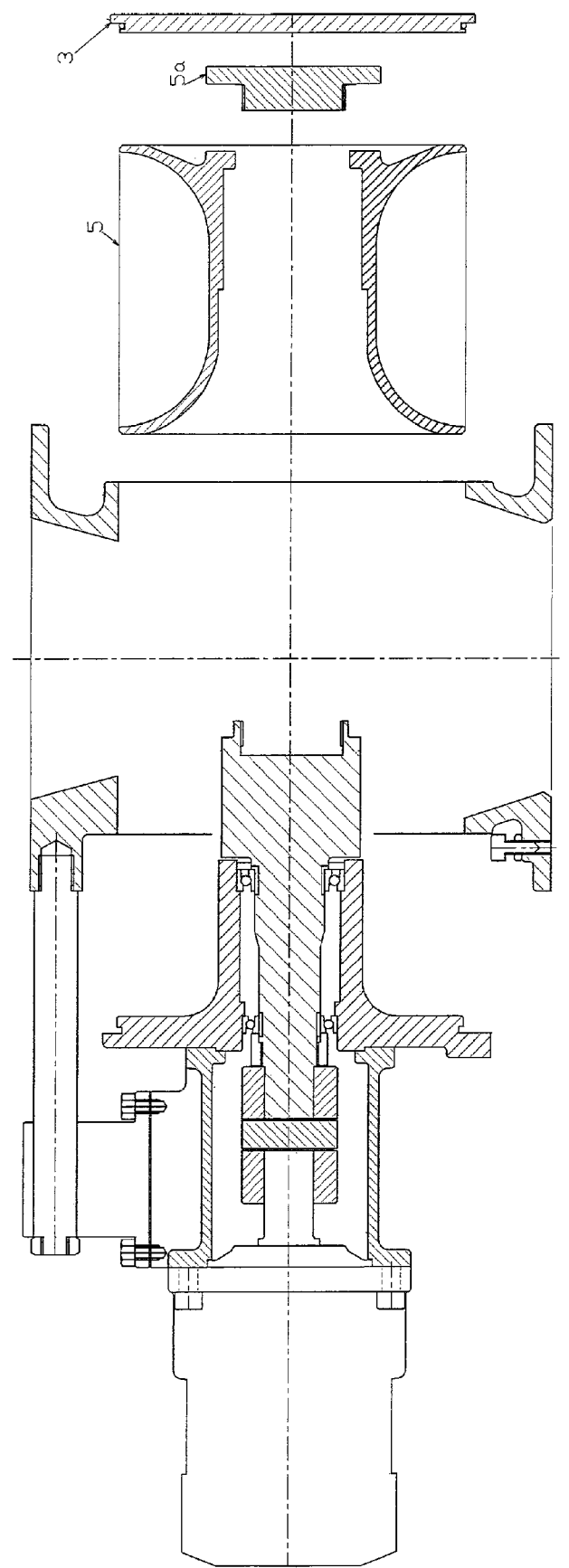
FIG. 4 is a sectional view of the sanitary rotary valve according to the preferred embodiment in a state in which a side plate 2 is disassembled and extracted.

As shown in FIGS. 3-5, the sanitary valve according to the preferred embodiment includes:
a casing 1 having horizontal hole, upper opening A and lower opening B, and,
side plate 2, having center hole, and a cylinder 2a extended towards inside, and
a door 3, provided on the opposite side of the side plate 2, fixed to casing 1 by knobs 3a as detachable, and
a shaft 4, passing through the center hole of side plate 2, and
a rotor 5, having pockets C and fixed to shaft 4 as detachable, and
ball bearings 6a, 6b, between side plate 2 and shaft 4, and
seal packing 7, between side plate 2 and shaft 4, and
a motor mount 8, fixed to outside of side plate 2 by bolts, and
a geared motor 9, fixed to motor mount 8 by bolts, and
a coupling 10, connecting shaft 4 and geared motor 9, and
an O-ring 11, between casing 1 and side plate 2, and
an O-ring 12, between casing 1 and door 3.

The torque of geared motor 9 is translated to shaft 4 by coupling 10. One end of shaft 4 and one end of rotor 5 have hexagonal shape or key to translate rotating torque. Rotor 5 is fixed by a detachable screw nut 5a.

As features of the present invention, FIG. 3 shows the particular parts wherein
a cylinder 2a of side plate 2 having length up to the center of rotor 5, and
a set bolt 13 supporting side plate 2 vertically, screwed in the lower flange of casing 1, and
two set bolts 14 supporting side plate horizontally, screwed in the flange of side plate 2, and
a hanger 15 hanging motor mount 8, and
a rod 16 supporting hanger 15, fixed at the edge of upper flange of casing 1, and
electrical insulating bushes 17a, 17b between shaft 4 and ball bearings 6a, 6b, and
ball bearings 6a,6b of angular type, and
a screw nut 18 keeping full contact of angular ball bearings 6a, 6b and
a middle piece 10a made of electrically insulating material, and
both side pieces 10b made of metal, of coupling 10, and
an electrical contact 19 touching the side piece 10b of the coupling 10, and
an electrical alarm system 20 receiving electrical power supply from electrical power source D and feeding power to geared motor 9, and connected with electrical contact 19 and earth.

In order to attain the first object that prevents an accident of touching between casing 1 and rotor 5 and contamination of powder products, there is provided a long cylinder 2a of side plate 2, and angular bearing 6a is located near the center of rotor 5. The active point of the force caused by the differential pressure between upper and lower sides of rotor 5 on to rotor 5 is near to angular bearing 6a, so bending moment for rotating shaft 4 is few. This bending moment is covered by cylinder 2a instead of shaft 4. The cylinder 2a is much stronger for bending moment than shaft 4.

Angular type ball bearings 6a, 6b are used, and screw nut 18 keeps full contact of bearings without inner clearance of bearing.

So, total displacement and inclination of shaft 4 and rotor 5 is few.

Another aspect to prevent contamination is the electrical alarm system for detecting contact between casing 1 and rotor 5. Rotor 5 and shaft 4 are electrically isolated from casing 1 and side plate 2 by electrical insulating bushes 17a, 17b and electrically insulating middle piece 10a of coupling 10, but electrically connected with contact 19 only. The electrical alarm system 20 supplies a small voltage such as 12V between contact 19 and earth. Once the rotor 5 touches casing 1, an electrical current less than 1 mA occurs. The electrical alarm system 20 picks up this current as a signal, and cuts off power supply to geared motor 9 automatically, and the alarm signal gives warning to an operator. In this way, the accident of contact between casing 1 and rotor 5 can be detected perfectly, and risk of contamination is eliminated. The electric current is so small as less than 1 mA that a spark does not occur at the contact point between casing 1 and rotor 5. So there is no possibility of powder explosion.

In order to attain the second object that the inserted part of side plate 2 and groove 2b for O ring 11 can be cleaned in regular maintenance as required by the standard of "Commercial powdered production equipment NSF/ANSI 8", side plate 2 can be disassembled by loosening knobs without any tools, and extracted by hanger 15 and rod 16 as shown in FIG. 4. When side plate 2 is reassembled with casing 1, the side plate 2 is supported vertically by a set bolt 13 screwed in the lower flange of casing 1, and supported horizontally by two set bolts 14 screwed in the flange of side plate 2 as shown in FIG. 5. In this way, side plate 2 can be set at correct position and the clearance between casing 1 and rotor 5 can be kept correctly. For the purpose of not disturbing the setting of side plate 2 in the correct position, enough clearance is provided for the connecting bolts between hanger 15 and side plate 2.

I claim:

1. A sanitary rotary valve comprising:
a casing;
a side plate provided at a first side of the casing;
a door provided at a second side of the casing;
a rotor provided in the casing;
a rotatable shaft for rotating the rotor;
a geared motor for rotating the rotatable shaft;
a motor mount for mounting the geared motor; and
a coupling which connects the geared motor and the rotatable shaft,
wherein the side plate has a cylinder which extends into the casing and is inserted into the rotor, and the cylinder has a length such that the cylinder extends to an approximate center of the rotor;
wherein the shaft is inserted into the cylinder of the side plate; and
wherein a supporting bearing for rotatably supporting the shaft is provided at an end of the cylinder, which end is disposed at the approximate center of the rotor.

2. The sanitary rotary valve according to claim 1, wherein set bolts are provided to support the side plate vertically and horizontally with respect to the casing.

3. The sanitary rotary valve according to claim 1, further comprising a hanger to hang the motor mount, and a connecting rod along which the hanger is slidable.

4. The sanitary rotary valve according to claim 1, further comprising:
   electrically insulating bushes provided between the shaft and the side plate;
   wherein the coupling comprises an electrically insulating middle piece, and an electrically conductive end piece which is attached to the shaft;
   wherein the shaft is electrically insulated from the side plate by the electrically insulating bushes, and by the electrically insulating middle piece of the coupling;
   wherein the sanitary valve further comprises:
      an electrical contact which contacts the electrically conductive end piece of the coupling; and
      an electrical alarm system which is electrically connected to the electrical contact, which receives an electrical power supply and feeds power to the motor under a normal operating condition, and which is adapted to detect an electric current between the casing and the rotor which occurs if the rotor contacts the casing;
   wherein the electrical alarm system cuts power supply to the geared motor and makes an alarm signal if an electric current between the rotor and the casing is detected.

5. The sanitary rotary valve according to claim 1, further comprising:
   a screw nut;
   wherein the bearings are angular bearings; and
   wherein the angular bearings and the screw nut support the shaft without any looseness.

* * * * *